United States Patent [19]

Brenner

[11] 4,095,000

[45] June 13, 1978

[54] PROTEIN-SAVING FOODSTUFF AND FODDER ADDITIVE

[75] Inventor: Max Brenner, Basel, Switzerland

[73] Assignee: Max Brenner, Basel, Switzerland

[21] Appl. No.: 578,228

[22] Filed: May 16, 1975

[30] Foreign Application Priority Data

May 17, 1974 Switzerland .......................... 6801/74

[51] Int. Cl.² .......................... A23J 1/00; A23J 3/00; A61K 37/00; C07C 103/52
[52] U.S. Cl. ........................................ 426/656; 536/8; 536/18; 536/4; 260/112.5 R; 424/177; 424/180; 426/658; 426/661; 426/69; 426/623; 426/636; 426/635; 426/807
[58] Field of Search ........ 260/210 R, 210 F, 112.5 R, 260/211 R; 424/177, 180; 426/656, 658, 661, 69, 623, 635, 807

[56] References Cited

U.S. PATENT DOCUMENTS

| | | | |
|---|---|---|---|
| 2,824,870 | 2/1958 | Neukom | 426/661 |
| 3,645,852 | 1/1972 | Axen et al. | 260/112.5 R |
| 3,778,513 | 12/1973 | Shiga et al. | 536/24 |
| 3,788,948 | 1/1974 | Kagedal et al. | 260/112 B |
| 3,840,676 | 10/1974 | Yamamoto et al. | 426/656 |
| 3,860,574 | 1/1975 | Naito et al. | 424/180 |
| 3,878,305 | 4/1975 | Damico et al. | 426/656 |
| 3,909,361 | 9/1975 | Hata et al. | 260/211 R |
| 3,911,915 | 10/1975 | Seifter et al. | 424/180 |
| 4,009,264 | 2/1977 | Mizutani | 260/112.5 R |

*Primary Examiner*—Delbert R. Phillips
*Attorney, Agent, or Firm*—Ladas, Parry, Von Gehr, Goldsmith & Deschamps

[57] ABSTRACT

Foodstuff and fodder additives are made by linking essential aminoacids to carbohydrates or other assimilable polyhydroxy compounds in such a way that the aminoacid is liberated in the digestive tract.

9 Claims, No Drawings

PROTEIN-SAVING FOODSTUFF AND FODDER ADDITIVE

From the point of view of nutritional physiology, one distinguishes between high-grade and lower-grade protein. The criterion for making this distinction is the assimilability by the human or animal organism. This is a question of digestibility, that is to say of the liberation of the protein aminoacids in the digestive tract, but above all a question of the protein composition in respect of the content of the various known protein aminoacids, which number about 20. In the context a term used for brevity is the "aminoacid composition". It is of practical importance from a nutritional point of view. This is because the human or animal organism requires, for its synthetic processes, all of the types of aminoacid, numbering about 20, which have been mentioned, but can, if the need arises, only synthesise 10 to 12 of these itself. The remaining aminoacids, which cannot be synthesised physiologically, are described as "essential" aminoacids [R. Jacquot and A. Rerat, Congres Mondial d'Alimentation Animale (Madrid) 1, 329–407 (1966); R. Pion, Industries de l'Alimentation Animale 6, 29–36 (1971); J. W. G. Porter and B. A. Rolls, Proteins in Human Nutrition, Academic Press, London & New York, 1973]. This means that they have to be taken in with the food, either in a chemically bound form such as, for example, in protein present in the food, or in a free form such as, for example, in the form of hydrolysed protein.

The mere occurrence of the essential aminoacids in the food is however insufficient since they are consumed by the organism immediately after absorption. Storage is not possible. For this reason, the essential aminoacids must be supplied to the organism in the quantities required for the present purpose, that is to say in a suitable amount and consequently also in a suitable ratio, if their optimum metabolic utilisation is to be ensured.

The main nutrients for man and stock animals are of vegetable origin. Because of their unfavourable aminoacid composition, their protein constituents are frequently of more or less low quality, that is to say only partially assimilable. The remainder, which is not assimilable, is lost in the course of the metabolism, in as much as it is not utilised as protein but only as a source of calories in combustion oxidation processes. In view of the world-wide shortage of protein, this extremely undesirable wastage is counteracted by "supplementing" the vegetable protein in bread (Japan) and in fodder by adding industrially produced essential protein aminoacids; this supplement entails modifying the ratio of the essential aminoacids to one another by admixture so that the assimilability of the protein constituent present reaches a higher level. Accordingly, the addition of suitable synthetic aminoacids in correctly chosen amounts serves to save protein (Japan Chemical Week, Feb. 22, 1973, page 11).

The essential aminoacids which are currently of the greatest economic importance in this context are methionine and lysine; tryptophane and threonine are undergoing development. The former two compounds are already large-scale industrial products. The annual consumption of methionine in 1971 was about 30,000 tonnes and that of lysine about 8,000 tonnes (Japan Chemical Week, 16th March 1972, page 11). It is estimated that these figures will rise by 1980 to about 120,000 tonnes and 65,000 tonnes respectively (Bureau d'Etudes Industrielles et de Cooperation de l'Institut Francais du Petrole, cited in Chemical & Engineering News, Dec. 24, 1973).

A delaying factor which stands in the way of even more rapid expansion of the volume consumed is on the one hand the flavour, which is unpleasant in the case of methionine and sweetish in the case of lysine hydrochloride, and, on the other hand, the instability of these free aminoacids in passing through the rumen of ruminants, which is why their use has hitherto essentially been restricted to the raising of poultry and pigs.

The problem of flavour is the greatest obstacle to a broad dietetic use, not only of methionine, but also of the other essential aminoacids. According to recent results, this problem should however also be given increased attention in animal raising and animal keeping.

Hitherto, unsuccessful endeavours have been made to deal with the problem of flavour and stability in an economically acceptable manner by the manufacture of derivatives and/or by using aminoacid formulations [compare, for example, R. S. Emery, Journal of Dairy Sci. 54, 1090–1091 (1971)].

The solution of the abovementioned problems has now been discovered, surprisingly, through a novel protein-saving additive for foodstuffs and fodder. The foodstuff and fodder additive according to the invention is characterised in that it consists of linked components which on the one hand belong to the category of the essential aminoacids (EA) and their assimilable functional derivatives and on the other hand to the category of the intramolecularly or intermolecularly bridged carbohydrates or other natural polyhydroxy compounds, the components of the two categories being bonded to one another by covalent bonds in such a manner that the aminoacid component is liberated in the digestive tract, either as such or in an assimilable form.

The component from the category of the essential aminoacids and their assimilable functional derivatives, hereafter referred to, for brevity, as the amino compound, can in the first place consist of the said essential aminoacids (EA). As regards the derivatives of the essential aminoacids, they may be esters, amides, peptides, peptide-esters and/or peptide-amides; the term peptide is also intended to embrace depsipeptides and those peptides in which other groups than $\alpha$-amino and/or $\alpha$-carboxyl groups participate at least partially in the peptide bonds, as well as those peptides which contain aminoacids which do not occur in protein, for example sarcosine, $\omega$-aminoacids and p-amino-benzoic acid. The presence of concomitants from the category of the non-essential aminoacids and their corresponding derivatives is not excluded.

Examples of the aminoacid component are methionine, methionylmethionine, methionine-amide, methionine ethyl ester, glycylmethionine, glycylglycylmethionine, methionylglycine, lysine, glycyllysine, isoleucine, methionine + lysine, tryptophane and threonine, as well as a mixture of methionine + lysine + leucine + isoleucine + valine + tryosine + phenylalanine + tryptophane + threonine, and finally $\alpha$-amino-$\gamma$-methylmercapto-butyronitrile, an intermediate product of the manufacture of methionine. Methionine, methionine-amide and methionylmethionine can originate from the no longer utilisable mother liquors of the manufacture of methionine, whilst lysine, which because of its high solubility can only be isolated rather laborously, can originate from the fermentation liquors of the manufacture of lysine. For this reason, other concomitants than those mentioned above may also be present.

The component from the category of the intramolecularly or intermolecularly bridged carbohydrates and other natural polyhydroxy compounds, referred to hereafter, for brevity, as the carrier, preferably consists of crosslinking products such as are produced when known cyanation or phosgenation processes are applied to non-reducing disaccharides, oligosaccharides or polysaccharides from the range of the pentoses and/or hexoses, and also to reducing saccharides, anhydro-sugars, amino-sugars, sugar alcohols, inositols, one-acids, urone-acids, sugar-acids and their soluble or swellable polymerisation and substitution products, such as pectins, alginates, agar, hemicelluloses, gum arabic and the like. Even polysaccharide derivatives obtained by chemical modification and not occurring in nature can, if they are soluble of swellable and physiologically tolerated, be present as the polyhydroxy component in the crosslinking products mentioned.

Here again the presence of concomitants is not excluded, particularly if the carrier is not prepared by cyanation or phosgenation of a purified carbohydrate but, for example, directly from potato mash.

Cyanation processes using cyanogen halides or organic cyanates are described in Acta Chem. Scand. 25, 1855-1859 (1971) and processes using sodium cyanide/sodium hypochlorite are described in Belgian Pat. No. 807,690; a survey of phosgenation processes and related processes is to be found in Adv. Carbohydrate Chem. 15, 91-158 (1960).

A cyanated carrier of the type described bonds spontaneously to amino compounds which can be substituted at the nitrogen. This is known, but there is at yet no clear information on the nature of the covalent bond produced (Acta Chem. Scand. 26, 285 (1972)). The degree of crosslinking of the carrier appears to decrease as a consequence of the fixing of the amine and the reactive groupings which are not consumed in the course of fixing the amine become stabilised, in the course of which, inter alia, carbonic acid diester groupings and/or urethane groupings and/or urea groupings are probably produced. Information hitherto available on the covalent bonding between the amino compound and the preferred carrier can be summarised schematically in the formulae:

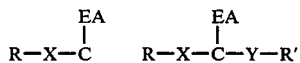

Herein, EA denotes the radical of the essential aminoacid, or if its derivative, which is linked at least via the amine group, R and R' denote a portion of the structure of the hydroxylic component, for example of crosslinked amylose, with R and R' symbolising one and the same polysaccharide chain or adjacent chains, C denotes a carbon atom and X and Y denote hetero-atoms, such as oxygen and nitrogen, which can be identical or different.

The procedure used to manufacture the preferred foodstuff additive or fodder additive is, for example, the following:

Potatoes are steamed for 30 minutes at 110°-120° C under 0.5-1 atmosphere gauge and are peeled and stirred with 6 parts by weight of water per part by weight (about 28% of solids) to give a fine mash (bar-type mixer). 19 parts by weight of water are added, 1/10 part by weight of sodium cyanide is then added, the mixture is cooled to 0°-5° C and a solution of sodium hypochlorite is run in slowly whilst stirring vigorously and keeping the temperature at 0°-5° C. The cyanation is discontinued after 0.95 to 1 mol of NaOCl has been consumed per mol of NaCN. The highly swollen but readily filtrable reaction product is separated from the excess water on a suction filter, the filter cake is thoroughly eluted with water (wet weight 2-3 parts by weight) and stirred with 1/20 part by weight of methionine, and the material is kept overnight at room temperature and is then eluted exhaustively on a suction filter. Dry weight 0.28 part by weight; sulphur content 4.5% as compared with traces in the potato meal. Methionine content about 22%.

A product (1.4 kg) containing about 23% of methionine is obtained analogously from 1 kg of soluble starch, dissolved in 100 l of water, 1 kg of sodium cyanide, the amount of sodium hypochlorite solution required for almost complete consumption of the cyanide, and 1 kg of methionine, the excess methionine subsequently being recovered.

The methionine does not have to be employed in an undiluted form. The cyanated carrier will also fix methionine from, for example, a solution saturated with sodium sulphate (mother liquor from the manufacture of methionine).

A phosgenated carrier of the type described contains carbonic acid diester and chloroformic acid ester groupings, the amine being fixed either directly via the latter or by reaction of residual free hydroxyl groups of the phosgenated carrier with isocyanates, which are in turn obtainable from suitable aminoacid components and phosgene. If isocyanates produced from the aminoacid component are used, the glycosidic crosslinking in a carbohydrate component at times suffices to provide the desired solubility properties or swelling properties in the food and fodder additive according to the invention.

The preferred food and fodder additive according to the invention decomposes, on alkaline hydrolysis, into carbon dioxide, at least one amino compound and at least one poly-alcoholic compound, which term is intended to include both carbohydrates and other polyhydroxy compounds. In the preferred additive according to the invention the molecular main constituents, namely the aminoacid component and the hydroxylic component (that is to say the carbohydrate or other polyhydroxy compound) were thus held together by carbon dioxide via covalent bonds, probably in the main via —O—C—N— and —O—C—O— bonds. In each case, the central carbon atom is a carbon dioxide carbon, the oxygen atoms are, for example, carbohydrate structural elements, and the nitrogen atom is a structural element of the amino compound, for example of methionine.

The molecular components, that is to say an aminoacid component, such as methionine, and a polyhydroxy compound, especially a carbohydrate, thus form, together with the bonds mentioned, the essential structural characteristic of the preferred foodstuff additives and fodder additives according to the invention.

Where the carrier is an intermolecular polycarbonic acid diester, each carbonyl group of the carbonic acid forms a bridge element between two polyhydroxylic molecules, which in turn are bridged via carbonyl groups to further polyhydroxylic molecules, and the like. To that extent the carrier is thus no different in nature from a product of polyhydroxy compounds or carbohydrates which have been cross-linked at least two dimensionally via carbonic acid carbonyl groups. In accordance with this hydrophilic structure, it is water-soluble or swellable.

The solubility in water, or swellability, remain preserved if this carrier is linked to the abovementioned amino compounds, which are also hydrophilic, in the foodstuff and fodder additive according to the invention. The solubility of swellability of the additive are also retained on drying, so that in the moist medium of the digestive tract its chemical reactivity, that is to say, in this instance, its ability to be split by enzymes, again applies.

On the other hand, the amino compound fixed to the carrier is at least partially resistant to the flora of the rumen; in fact the amino compound is—as demonstrated—bound, at least partially, in a similar manner to how it is bound in the protein which has been brought into an insoluble form—in order to increase its resistance to the flora of the rumen—either by heating [L. B. Sherrud and A. D. Tillman, Journal of Animal Sciences 21, 901 (1962) and 23, 294 (1964) or by a tannin treatment [S. Z. Zelter, F. Leroy and J. P. Tissier, Ann. Biol. Anim. Bioch. Biophys. 10, 111–122 (1970)].

Whilst the slight chemical change in the essential aminoacid, caused by fixing, already results in a change in taste, the taste which still remains also disappears with increasing insolubility of the carrier used for fixing. Obviously a given carrier can be linked to only one, or simultaneously to several, or simultaneously to all, essential aminoacids. The possible presence of non-essential aminoacids must also not be excluded, since they merely decrease the yield of bonding of the essential aminoacids, through competing with them during the fixing reaction. Evidently any desired ratio of the essential aminoacids can be ensured when fixing a mixture, if necessary taking into account different fixing yields and digestion yields.

The food and fodder additive according to the invention can be used as such, that is to say it can be admixed with the food or the fodder. It can however also first be mixed with a diluent or ballast material which is harmless from the point of view of nutritional physiology and which for example makes it more bulky, and can then be added in this form to the food or the fodder.

At times it is possible to produce the additive in situ, that is to say, for example, to phosgenate the customary food or the customary fodder and thereafter, or simultaneously, to admix the aminoacid component which is to be fixed.

The preferred food and fodder additive according to the invention is a surprising, technically simple and economical solution of the taste and stability problems mentioned initially. In particular, it was not to be foreseen how the products would behave from the point of view of taste and of nutritional physiology. The "digestability" on the one hand, and the resistance to rumen flora, on the other, are particularly surprising. The products are very well tolerated in amounts employed as a protein supplement, in particular in chickens, rats, pigs, cattle and sheep.

TOLERATION OF THE CARRIER OBTAINED FROM CYANATED SUCROSE

Fully grown laboratory rats were given, for one month, a feed which consisted, based on solids, of 80–90% of the customary feed used for raising the rats and of 20–10% of cyanated sucrose (prepared from 1 part of sucrose and 1 part of sodium cyanide together with the requisite amount of sodium hypochlorite solution). The animals behaved normally in spite of extreme doses.

Example 1

| Fattening fodder for cattle Composition of the rations (%) | |
|---|---|
| Shredded maize | 74.00 |
| Green lucerne meal | 13.10 |
| Shredded oats | 5.00 |
| Molasses | 4.40 |
| Feed urea | 1.00 |
| Dicalcium phosphate | 0.80 |
| Mineral salt mixture* | 0.80 |
| Sodium chloride | 0.30 |
| Fodder additive according to the invention | 0.60 |
| | 100.00 |

*The mixture contains the following, relative to 1 kg of the final fodder:
| | | |
|---|---|---|
| 15,000 | I.U. | of Vitamin A |
| 1,500 | I.U. | of Vitamin $D_3$ |
| 50 | mg | of zinc oxide |
| 40 | mg | of copper sulphate |
| 24 | mg | of manganese sulphate |
| 1 | mg | of cobalt sulphate |
| 0.3 | mg | of potassium iodide |

Example 2

| Fattening fodder for pigs Composition of the rations (%) | |
|---|---|
| Maize | 41.00 |
| Shredded soya | 18.50 |
| Oats | 15.00 |
| Barley | 15.00 |
| Fishmeal | 5.00 |
| Animal carcase meal | 3.00 |
| Dicalcium phosphate | 0.78 |
| Calcium carbonate | 0.65 |
| Sodium chloride | 0.27 |
| Vitamin premix* | 0.20 |
| Fodder additive according to the invention | 0.60 |
| | 100.00 |

*The vitamin premix (based on fine soya flour) contains 2.0 g (= per kg of base ration): 20,000 I.U. of Vitamin A, 2,500 I.U. of Vitamin $D_3$, 20 mg of Vitamin E, 1 mg of Vitamin $K_3$, 50 mg of ascorbic acid, 2 mg of thiamine, 4 mg of riboflavin, 2 mg of pyridoxin, 10 mg of Ca pantothenate, 30 mg of nicotinic acid, 10 mcg of Vitamin $B_{12}$, 150 mg of chlorine chloride and the following trace elements (as sulphates): 80 mg of Fe, 50 mg of Zn, 50 mg of MN and 50 mg of Cu.

Example 3

| Single fattening feed for poultry Composition of the rations (%O | |
|---|---|
| Shredded maize | 22.02 |
| Shredded soya | 20.23 |
| Residual (?) wheat flour | 20.00 |
| Wheat | 15.50 |
| Tapioca | 9.00 |
| Fishmeal | 4.00 |
| Feed fat | 3.00 |
| Molasses | 3.00 |
| Vitamin/active compound mixture[x)] | 1.00 |
| Carbonated feed lime | 0.71 |
| Dicalcium phosphate | 0.74 |
| Feed additive according to the invention | 0.80 |
| | 100.00 |

*This contains the following, per kg of the final feed:
| | | |
|---|---|---|
| Vitamin A | 10,000 | I.U. |
| Vitamin $D_3$ | 1,500 | I.U. |
| Vitamin $B_2$ | 4 | mg |
| d-Ca-pantothenate | 8 | mg |
| niacine | 20 | mg |
| Vitamin $B_{12}$ | 10 | mcg |
| Vitamin $K_3$ | 2 | mg |
| Manganese | 80 | ppm |
| Zinc | 80 ppm | |
| Copper | 5 | ppm |
| Cobalt | 5 | ppm |

Example 3-continued

| Single fattening feed for poultry Composition of the rations (%O | |
|---|---|
| Iodide | 0.5 ppm |

I claim:

1. Protein-saving foodstuff and fodder additive, comprising the following linked components:
   (1) nutritive substances consisting of essential aminoacids and derivatives thereof selected from the group consisting of methionine, methionylmethionine, glycylmethionine, glycylglycylmethionine, methionylglycine, lysine, glycyllysine, isoleucine, tryptophane and threonine; and mixtures of methionine and lysine, and mixtures of methionine, lysine, leucine, isoleucine, valine, tyrosine, phenylalanine, tryptophane and threonine; and esters and amides of said compounds and of said mixtures of compounds; and α-amino-γ-methylmercapto-butyronitrile; and
   (2) polyhydroxy compounds selected from the group consisting of non-reducing disaccharides, oligosaccharides and polysaccharides, all being derived from pentoses and hexoses, derivatives of said polysaccharides which are chemically modified, reducing saccharides, and mixtures thereof, said polyhydroxy compounds being modified by cyanation or phosgenation;
   whereby components (1) and (2) are linked by hydrolyzable carbon atoms which upon hydrolysis are released in the form of carbon dioxide, the bonding from said hydrolyzable carbon atoms to component (1) being to primary or secondary amino groups that constitute part of the amino acid or amino acid derivative structure, and the bonding from said hydrolyzable carbon atoms to component (2) being to oxygen or nitrogen atoms attached to carbon atoms of said polyhydroxy compounds, both mutually bonded components being liberated upon hydrolysis at the same time as the carbon dioxide originating from the bonding carbon atoms.

2. Additive according to claim 1, in which the polysaccharide is a pectin, an alginate, an agar, a hemicellulose or a plant gum.

3. Additive according to claim 1, which is such that on alkaline hydrolysis it decomposes into carbon dioxide, at least one amino compound and at least one polyhydroxy compound.

4. Foodstuff and fodder, containing the foodstuff or fodder additive according to claim 1 in addition to customary food or customary fodder.

5. Additive according to claim 1, in which the position of the essential aminoacid in the derivatives thereof is not N-terminal.

6. Additive according to claim 1, in which the essential aminoacid is methionine.

7. Additive according to claim 1, in which the essential aminoacid is lysine.

8. Additive according to claim 1, in which the essential aminoacid is tryptophane.

9. Additive according to claim 1, in which the essential aminoacid is threonine.

* * * * *

UNITED STATES PATENT AND TRADEMARK OFFICE
CERTIFICATE OF CORRECTION

PATENT NO. : 4,095,000
DATED : June 13, 1978
INVENTOR(S) : Max Brenner

It is certified that error appears in the above—identified patent and that said Letters Patent are hereby corrected as shown below:

In the title page item [73] referring to the assignee as "Max Brenner" should read --Beat Max Brenner--.

Signed and Sealed this

Fourteenth Day of November 1978

[SEAL]

Attest:

RUTH C. MASON
Attesting Officer

DONALD W. BANNER
Commissioner of Patents and Trademarks